(12) United States Patent
Aota et al.

(10) Patent No.: US 7,636,142 B2
(45) Date of Patent: Dec. 22, 2009

(54) LIQUID CRYSTAL DISPLAY DEVICE

(75) Inventors: Masaaki Aota, Ogaki (JP); Yasuo Segawa, Kitagata-cho (JP); Tomohide Onogi, Anpachi-cho (JP)

(73) Assignee: Epson Imaging Devices Corporation, Azumino (JP)

( * ) Notice: Subject to any disclaimer, the term of this patent is extended or adjusted under 35 U.S.C. 154(b) by 176 days.

(21) Appl. No.: 12/010,843

(22) Filed: Jan. 30, 2008

(65) Prior Publication Data

US 2008/0204614 A1 Aug. 28, 2008

(30) Foreign Application Priority Data

Feb. 26, 2007 (JP) .............................. 2007-045969

(51) Int. Cl.
G02F 1/133 (2006.01)
G02F 1/1335 (2006.01)
(52) U.S. Cl. ........................................ 349/114; 349/33
(58) Field of Classification Search ................ None
See application file for complete search history.

(56) References Cited

U.S. PATENT DOCUMENTS

2006/0203157 A1* 9/2006 Ozawa et al. ............... 349/114
2006/0215081 A1* 9/2006 Song et al. .................. 349/107

FOREIGN PATENT DOCUMENTS

JP A 2005-107535 4/2005

* cited by examiner

Primary Examiner—Tina M Wong
(74) Attorney, Agent, or Firm—Oliff & Berridge, PLC (57) ABSTRACT

A liquid crystal display device includes an upper electrode and a lower electrode interposing an insulation layer therebetween, wherein an electric field opening part for passing an electric field is formed in the upper electrode and liquid crystal molecules are driven by applying a voltage between the lower electrode and the upper electrode, wherein a window-shaped opening part formed by partially removing the lower electrode for connecting an upper electrode wiring and the upper electrode, which interpose an interlayer insulation film therebetween, together is disposed in a lower part of the lower electrode, and wherein one end portion of the electric field opening part in the longitudinal direction around the window-shaped opening part is disposed to be overlapped with the window-shaped opening part in a plan view.

9 Claims, 7 Drawing Sheets

LIQUID CRYSTAL DISPLAY DEVICE

BACKGROUND

1. Technical Field

The present invention relates to a liquid crystal display device, and more particularly, to a liquid crystal display device having upper and lower electrodes interposing an insulation layer therebetween in which an electric field opening part for passing an electric field is formed in the upper electrode and liquid crystal molecules are driven by applying a voltage between the upper and lower electrodes.

2. Related Art

As a display method for liquid crystal displays, generally, a TN (Twisted Nematic) mode has been widely used. However, there is a limitation on the viewing angle according to the display principle of the TN mode. As a method for solving this problem, a horizontal electric field method in which a pixel electrode and a common electrode are formed on a same substrate as a pair of electrodes for driving liquid crystal molecules, a voltage is applied between the pixel electrode and the common electrode so as to generate an electric field approximately parallel to the substrate, and the liquid crystal molecules are driven within a plane substantially parallel to the substrate surface has been known.

As the horizontal electric field method, an IPS (In Plane Switching) type and an FFS (Fringe Field Switching) type have been known. In the IPS type, a pixel electrode having a comb-teeth shape and a common electrode having a comb-teeth shape are combined to be disposed. The comb-teeth shape is formed in a configuration in which one end portion of an opening part, formed for passing an electric field, in the longitudinal direction is closed, the other end portion of the opening part is opened, and the one end portions of each opening part are connected together in a case where a plurality of the opening parts is disposed.

On the other hand, in the FFS type, an upper electrode and a lower electrode interposing an insulation layer therebetween are formed, one between the upper and lower electrodes is assigned as a common electrode, the other is assigned as a pixel electrode, and an opening part, for example, having a slit shape is formed in the upper electrode. Here, as an opening part used for passing an electric field, a thin and long groove shaped opening part in which both end portions of the opening part in the longitudinal direction are closed is formed. When a plurality of the groove-shaped opening parts is disposed, the opening parts are separately disposed.

The opening part is formed by etching an electrode layer thin film. When the opening part is formed, for example, to have a thin and long groove shape, there are many cases that edge portions of the opening part which are end portions in the longitudinal direction are formed to have a round shape or an arc shape. For example, in the FFS type, since an electric field that comes from the lower electrode, passes through the opening part, and progresses toward the upper electrode flows along the pattern of this opening part, and thus, a horizontal electric field is formed along the pattern of the arc shape. Accordingly, when the initial alignment of the liquid crystal molecules are set to be substantially parallel to a long side of the opening part, for example, by using a rubbing process or the like, the liquid crystal molecules are driven by applying a horizontal electric field, liquid crystal molecules located in a straight line portion of the long side of the opening part rotates in a direction perpendicular to the long side from the initial alignment state. However, liquid crystal molecules located in the edge portions of the opening part rotates in a direction perpendicular to the arc shape from the initial alignment state.

When the liquid crystal molecules rotate along the arc shape of the edge portions from its initial disposition state, there is a case where the rotation direction of the liquid crystal molecules is reversed and there is a case where the rotation direction of the liquid crystal molecules changes depending on locations. This phenomenon in which the rotation direction changes depending on the locations is called disclination. In a boundary in which the rotation direction changes, since the liquid crystal molecules may rotate in an undesired direction or cannot rotated, there is a case where the transmittance is lowered and the boundary is visually recognized. The case is referred to as a rotating tilt line, a rotation tilt defect, or simply disclination.

For example, in JP-A-2005-107535, it is described that, when a configuration in which a black matrix of an upper substrate and an edge portion of a pixel electrode of a lower substrate is overlapped in a predetermined area and a liquid crystal is interposed between the two substrates is used, the twist angle of liquid crystal molecules becomes almost 90° to be aligned in a vertical direction due to the interference of the electric field between the black matrix and the pixel electrode as the location of liquid crystal molecules moves from the end portion of the edge portion of the pixel electrode to a center portion. However, in JP-A-2005-107535, it is indicated that the edge portion has a curve shape due to limitation of the exposure process and thus a trace of rubbing, that is, disclination (a rotating tilt line) occurs in a white gray scale level.

The disclination will be described later in more detail, in comparison with embodiments of the invention.

As described above, when the disclination occurs in a part, transmittance in the part is lowered. Generally, when the disclination occurs, display quality may be judged to be lowered. As described above, the end portion of the opening part of the upper electrode in the longitudinal direction has an arc shape for improving the capacity of a process such as an etching process, and the electric field between the lower and upper electrodes passing through the opening part is formed along the pattern of the arc shape, and whereby the disclination occurs. Accordingly, in order to suppress the occurrence of disclination, it is needed to consider the shape, disposition, and the like of the opening part disposed in the upper electrode in relation with the lower electrode.

In addition, since a wiring for supplying a predetermined electric potential to the upper electrode is disposed on a lower layer side relative to the upper electrode, it is needed to remove the lower electrode, an insulation layer, and the like for connecting the wiring to the upper electrode. Accordingly, while a contact hole for connecting the wiring, which is used for supplying the electric potential, and the upper electrode together is provided, an area around the contact hole has a multi-level structure, and thus it is needed to consider the effect of the level difference when the opening part of the upper electrode is disposed.

As described above, although there are limitations such as disclination, the contact hole, and the level difference around the contact hole on the disposition of the opening part in the upper electrode, the disposition of the opening part has an effect on the display quality of the liquid crystal display.

SUMMARY

An advantage of some aspects of the invention is that it provides a liquid crystal display device, which has a configuration that an upper electrode and lower electrode interposing an insulation layer therebetween are included, an electric field opening part for passing an electric field is formed in the upper electrode, and liquid crystal molecules are driven by applying a voltage between the upper and lower electrodes, capable of improving display quality.

According to a first aspect of the invention, there is provided a liquid crystal display device including an upper electrode and a lower electrode interposing an insulation layer therebetween. An electric field opening part for passing an electric field is formed in the upper electrode and liquid crystal molecules are driven by applying a voltage between the lower electrode and the upper electrode. A window-shaped opening part formed by partially removing the lower electrode for connecting an upper electrode wiring and the upper electrode, which interpose an interlayer insulation film therebetween, together is disposed in a lower part of the lower electrode. One end portion of the electric field opening part in the longitudinal direction around the window-shaped opening part is disposed to be overlapped with the window-shaped opening part in a plan view.

By using the above-described configuration, the electric field opening part is disposed to be overlapped with the window-shaped opening part in a plan view, and this the electric field opening part can be disposed in a large area, and thereby it is possible to improve the display quality. In addition, since the lower electrode is removed below the one end portion of the electric field opening part, the electric field between the upper and lower electrodes is not applied to an arc shape portion even in a case where the end portion has the arc shape, and accordingly, it is possible to suppress the occurrence of the disclination and improve the display quality.

In the liquid crystal device, the window-shaped opening part may be disposed on an inner side relative to an outer circumferential end portion of the upper electrode. Since an area around the window-shaped opening part has a multi-level structure, the upper electrode becomes thin in the multi-level portion. In particular, when the window-shaped opening part in which the lower electrode is removed is formed on the outer circumferential end portion of the upper electrode, a boundary of the cut face of the level difference directly appears in the outer circumferential end portion. Accordingly, for example, an etching liquid or the like permeates from the boundary of the cut face of the level difference along the level difference, and thereby there is a possibility that the upper electrode forms a short circuit along the level difference. In addition, according to the configuration of the upper portion, since the window-shaped opening part is disposed on the inner side relative to the outer circumferential end portion of the upper electrode, it is possible to suppress the effect of formation of a short circuit due to the level difference of the window-shaped opening part or the like.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, embodiments of the present invention will be described in detail with reference to the accompanying drawings. As a liquid crystal display device having upper and lower electrodes interposing an insulation layer therebetween and driving liquid crystal molecules by forming an electric field opening part on the upper electrode for passing an electric field and applying a voltage between the upper and lower electrodes, a liquid crystal device having upper and lower electrodes disposed in a component substrate and interposing an insulation layer therebetween in which the upper and lower electrodes are configured as pixel and common electrodes will now be described. However, a reverse configuration, that is, a configuration in which the lower electrode is configured as the pixel electrode and the upper electrode is configured as the common electrode may be used.

In addition, a case where the electric field opening part having a slit shape in which both ends of the electric field opening in the longitudinal direction are closed is used will be described. However, the electric field opening part may have a comb teeth-like shape in which one end of the electric field opening part in its longitudinal direction is opened.

Furthermore, in an FFS mode described below, although the lower electrodes are divided for each pixel, however, the lower electrodes may not be divided for each pixel.

Before the embodiments of the invention are described, a mechanism of occurrence of disclination in a horizontal electric field driving mode will be described with reference to FIGS. 1 to 4, together with the configuration of a liquid crystal device.

Figure 1:
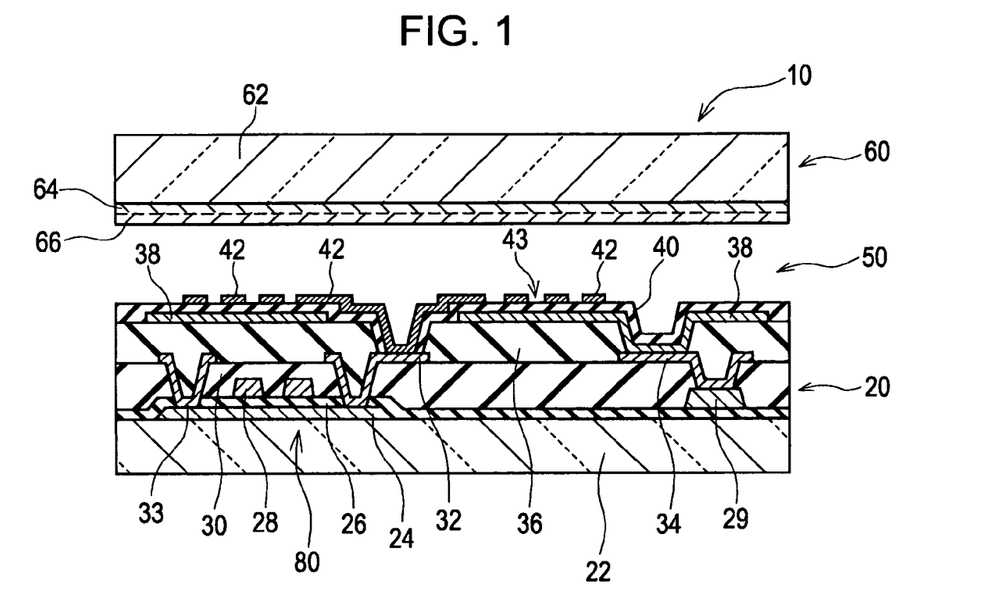
FIG. 1 is a sectional view of a liquid crystal display device for describing declination.
Figure 2:
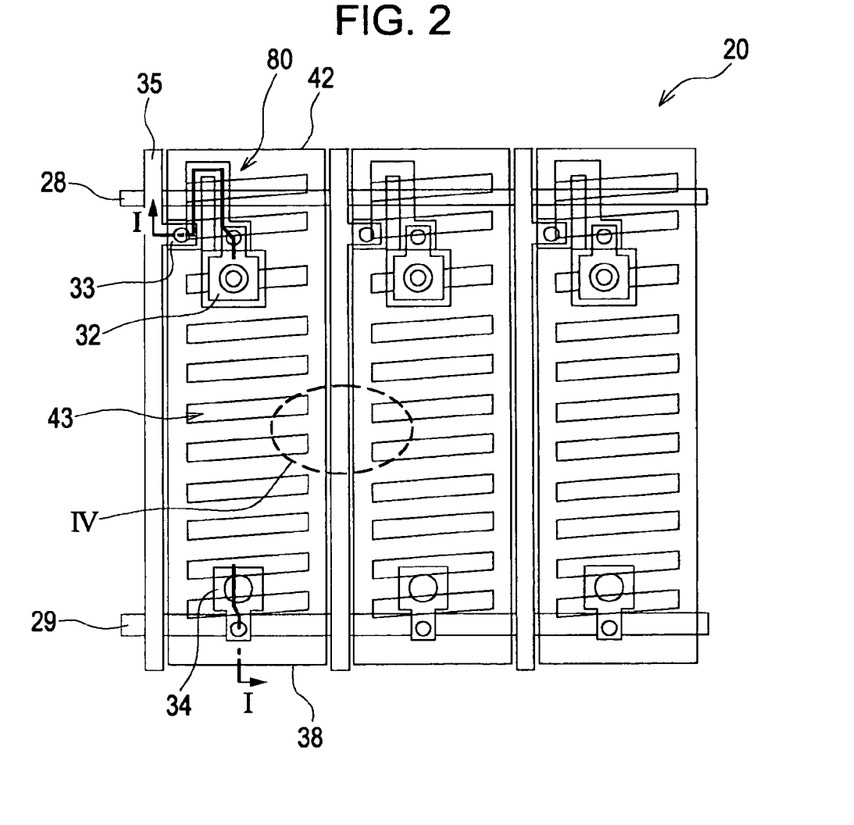
FIG. 2 is a plan view corresponding to the sectional view shown in FIG. 1.
Figure 3:
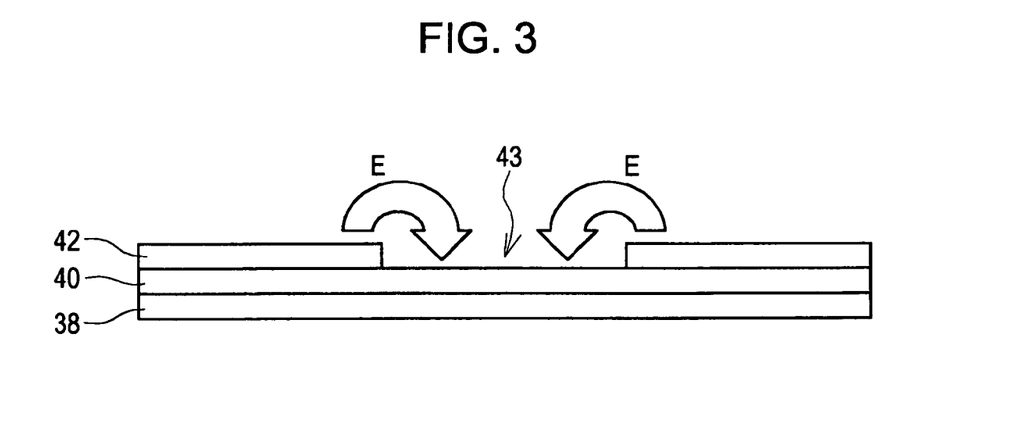
FIG. 3 is a diagram showing the form of an electric field applied between a common electrode and a pixel electrode.
Figure 4:
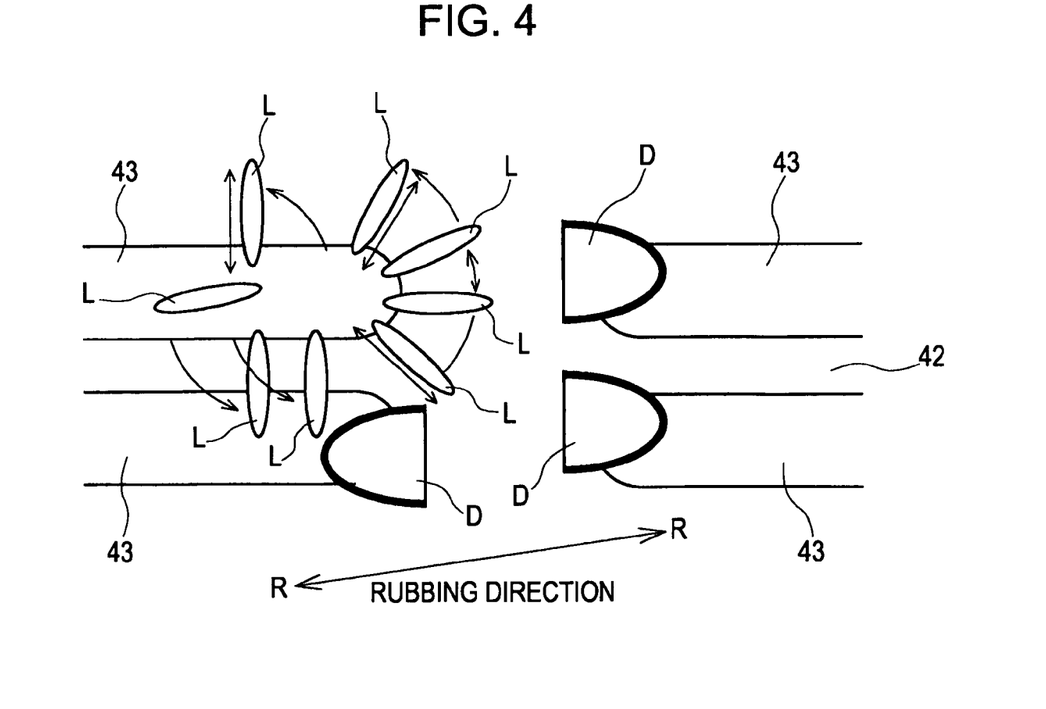
FIG. 4 is a diagram showing the form of occurrence of disclination in an edge portion of a slit.

FIG. 1 is a partly sectional view of one sub pixel of a color liquid crystal display device using an FFS mode. FIG. 2 is a plan view corresponding to the sectional view shown in FIG. 1 and shows three sub pixels corresponding to one pixel. FIG. 3 is a diagram showing a form of an electric field driving liquid crystal molecules in using the FFS mode. FIG. 4 is a diagram showing a state in which disclination occurs.

FIG. 1, as described above, shows one sub pixel part in the sectional view of the liquid crystal display device 10. Here, a sub pixel, for example, is a display part corresponding to R, G, or B when color display is performed by using R, G, and B. In this example, one pixel is constituted by three sub pixels of an R sub pixel, a G sub pixel, and a B sub pixel. As shown in FIG. 1, the liquid crystal display 10 includes a component substrate 20, an opposing substrate 60, and liquid crystal molecules 50 pinched between the component substrate 20 and the opposing substrate 60.

The opposing substrate 60 is a side of the liquid crystal display 10 that faces a user. The opposing substrate 60 has a configuration in which several films are stacked. In the example shown in FIG. 1, the opposing substrate 60 includes a glass substrate 62, a black matrix 64, and a color filter 66, in the sequence from the side facing the user toward the component substrate 20 side. In the sectional view shown in FIG. 1, since the black matrix 64 is hidden behind the color filter 66 or disposed below the color filter 66, it is denoted by a dotted line. The materials, the size, a forming method, and the like of the opposing substrate 60 which are known in a general method of manufacturing a liquid crystal display of an active matrix type can be employed, and thus detailed descriptions thereof are omitted here.

The component substrate 20 is also referred to as a TFT substrate or a TFT side substrate. The component substrate 20 is a substrate disposed on a side on which a TFT element used as a switching element 80 is disposed and faces the opposing substrate 60. Here, in the component substrate 20, a pair of electrodes for driving the liquid crystal molecules 50 is disposed. On the component substrate 20, a plurality of films patterned as a multi-layer structure is stacked by using known film forming technology and pattern forming technology.

In the example shown in FIG. 1, in the component substrate 20, a glass substrate 22, a semiconductor layer 24, a gate insulation film 26, gate and common electrode wirings 28 and 29 formed by using a same process, an interlayer insulation film 30, source and drain wirings 32 and 33 formed by a same process, a common electrode connecting part 34, an insulation film 36, a common electrode 38, an FFS insulation film 40, and a pixel electrode 42 are sequentially formed from the side not facing the user toward the liquid crystal molecule 50 side. The materials, the size, a forming method, and the like of the component substrate 20 which are known in a general method of manufacturing a liquid crystal display of an active matrix type can be employed, and thus detailed descriptions thereof are omitted here.

Although not shown in FIG. 1, an alignment film is formed on the pixel electrode 42. An alignment film is disposed on a side of the opposing substrate 60 which faces the liquid crystal molecules 50, similarly.

FIG. 2 is a plan view corresponding to the sectional view shown in FIG. 1. In the figure, one pixel constituted by three sub pixels is shown. In addition, FIG. 1 corresponds to a sectional view taken along line A-A shown in FIG. 2. Like reference numerals in FIGS. 1 and 2 denote like elements.

In each sub pixel, a gate line, a part of which becomes the gate electrode 28 and a data line 35 are disposed to be perpendicular to each other. In an intersection between the gate and data lines, the TFT element serving as a switching element 80 is disposed. The gate line becomes the gate electrode 28 shown in FIG. 1 around the switching element 80, and the data line 35 is connected to the source-drain wiring 33 shown in FIG. 1. As described above, the liquid crystal device 10 has TFT elements serving as switching elements 80 in the intersections of a plurality of gate lines and a plurality of data lines 31 and is so-called an active matrix display device. The gate line is also referred to as a scan line or a scan signal line. The data line 35 is also referred to as a signal line, a video signal line, or the like.

The TFT element serving as a switching element 80 is a transistor element having the gate insulation film 26 formed on the semiconductor layer 24 shown in FIG. 1, the gate electrode 28 formed on the gate insulation film 26, and the source and the drain connected to the source and drain wirings 32 and 33. TFT is an abbreviation for Thin Film Transistor. Between the source and drain of the TFT element serving as a switching element 80, one, for example, the drain is connected to the data line 31, and the other, for example, the source is connected to the pixel electrode 42. Since the drain and the source are compatible with each other, it may be configured that the source is connected to the data line 35 and the drain is connected to the pixel electrode 42. The drain and source of the TFT element serving as a switching element 80 are conducted by selecting the gate line, and in the example described above, a video signal transmitted from the data line 35 connected to the drain is supplied to the pixel electrode 42.

Here, the pixel electrode 42 is represented to have the same size as the common electrode 38. In other words, the pixel electrode 42 and the common electrode 38 are formed separately for each one sub pixel and are disposed on the whole area of the sub pixel except for the data line 35. In the example shown in FIG. 2, although the common electrode 38 is represented to be separately formed for each sub pixel, the common electrode 38 may be formed over sub pixels in some cases.

In the pixel electrode 42, a slit 43 is formed. The slit 43, as shown in FIG. 1, is an electric field opening part for driving liquid crystal molecules using an electric field by applying a voltage between the pixel electrode 42, which is an upper electrode, and the common electrode 38, which is a lower electrode, having the FFS insulation film 40 interposed therebetween. In FIG. 2, a plurality of the slits 43 is disposed in the pixel electrode 42 and the slits 43 are disposed to be spaced apart from one another and be parallel to a longitudinal direction of the opening part. The slit 43 is an opening part having a thin and long groove shape in which both ends in the longitudinal direction are closed, and thus the end portions in the longitudinal direction are formed to be round in an etching process. Hereinafter, the round end portion is referred to an edge portion. The disclination occurs in this edge portion.

FIG. 3 is a schematic diagram showing the form of an electric field E applied between the pixel electrode 42 and the common electrode 38. In the figure, the electric field E passing through the slit 43 disposed in the pixel electrode 42 and progressing toward the common electrode 38 through the FFS insulation film 40 is shown. On the other hand, there is a case where the electric field is formed in the opposite direction, that is, the electric field passes through the slit 43 from the common electrode 38 and progresses toward the pixel electrode 42.

FIG. 4 is an enlarged diagram of portion IV shown in FIG. 2 and is a schematic diagram showing the form of occurrence of the disclination in the edge portion that is an end portion of the slit 43. Here, the slit 43 is disposed horizontally in the left-to-right direction on the surface of the figure, and the rubbing direction R-R is slightly tilted toward the upper right side with respect to the horizontal direction on the surface of the figure. The tilt angle can be set to a specific angle, for example, an angle between 3° and 5° degrees. In other words, in a state that the electric field is not applied, the liquid crystal molecule L is tilted toward a slightly upper right side with respect to the slit 43. However, this rubbing direction is only an example for a description, and thus, a different direction or a different tilt angle may be configured.

The slit 43 is formed on a transparent conduction material film that forms the pixel electrode 42, for example, by using etching technology. Thus, as described above, the edge portion of the slit is quite or less round, and, as shown in FIG. 4, has an arc shape close to a half circle.

When the electric field E is not applied, a liquid crystal molecule L located in the edge portion of the slit 43 is in its initial disposition state and is adjusted in the rubbing direction. In other words, although the liquid crystal molecule is slightly tilted from the edge of the slit 43, the liquid crystal molecule is adjusted in a substantially parallel direction. When the electric field E is applied in this state, the liquid crystal molecule rotates along the direction of the electric field E to be almost perpendicular to the edge of the slit 43. Since the electric field is applied to the arc-shaped portion in a direction perpendicular to the edge of the slit 43, the arc shape rotates in the counterclockwise direction by a half circle along the edge of the slit 43, and accordingly, the direction of the electric field changes by 180° along the arc shape. For example, when an electric field is applied to a slit 43 located on the upper left side shown in FIG. 4, a liquid crystal molecule L on the upper long side on the slit 43 rotates in the counterclockwise direction. Similarly, a liquid crystal molecule L located on the lower long side of the slit 43 rotates in the counterclockwise direction. However, in a portion having an arc shape of a half circle, while a liquid crystal molecule L located in an upper quadrant portion of the arc shape rotates in the counterclockwise direction, a liquid crystal molecule L located in an lower quadrant portion of the arc shape rotates in the clockwise direction.

As described above, when the liquid crystal molecule L is to be rotated in a desired direction by applying an electric field, in the lower right quadrant of the arc shaped portion of the edge of the slit 43 on the right side, there is a case where the liquid crystal molecule L rotates in a direction opposite to the desired direction. In other words, there is a case where the liquid crystal molecule does not rotate in the desired direction. As described above, when a horizontal electric field is applied, there is a case where the rotation direction of the liquid crystal molecule L in the edge portion changes depending on its location. As described above, a phenomenon in which the rotation direction is different depending on the location is disclination. In a boundary in which the rotation direction changes, since the liquid crystal molecule L may be rotated in an undesired direction or cannot be rotated, there is a case where the transmittance is lowered and the boundary is visually recognized. The case is referred to as a rotating tilt line, a rotation tilt defect, or simply disclination. FIG. 4 shows a region denoted as D in which the disclination occurs.

In FIG. 4, the area D is an edge portion of a fringe of the slit 43. In particular, the area D is in the range from a place in which the direction of the normal line of the slit 43 coincides with the initial alignment direction of the liquid crystal molecule L, that is, the rubbing direction R-R to a place in which the direction of the normal line of the slit 43 forms an angle of 90° in the clockwise direction with respect to the rubbing direction. When an electric field is applied, in this range shown in FIG. 4, the liquid crystal molecule L rotates in the clockwise direction to be perpendicular to the fringe of the edge portion. On the other hand, in areas other then this area, the liquid crystal molecule L rotates in the counterclockwise direction to be perpendicular to the fringe of the slit 43. In other words, the area D in which the disclination in the edge portion of the slit 43 occurs is a range from a place in which the direction of the normal line of the slit 43 coincides with the rubbing direction R-R to a place forming 90° in the clockwise direction with respect to the rubbing direction.

In other words, as shown in FIG. 4, when the end portion of the opening part has an arc shape like the slit 43, an area D in which disclination occurs is the second and fourth quadrants of a circle having an x axis in the direction in which the slits 43 extend in the longitudinal direction and a Y axis perpendicular to the x axis when a tilt angle formed by a direction in which the end portion of the slit 43 in the longitudinal direction extends with respect to a rubbing direction R-R is in the positive direction, that is, an angle formed in the clockwise direction. On the other hand, when the tilt angle is in the negative direction, that is, an angle formed in a counterclockwise direction, the area in which disclination occurs are the first and third quadrants of the circle.

In addition, unlike FIG. 4, when the common electrode has a comb-teeth shape and the transparent conduction material portion has a arc shape, disclination occurs in the range from a position in which the direction of a normal line of an edge portion of the arc shape coincides with the rubbing direction to a position in which the direction of the normal line forms 90° with respect to the rubbing direction in accordance with rotation in the clockwise direction. Accordingly, in that case, an area D in which disclination occurs is the second and fourth quadrants of a circle having an X axis in the direction in which the transparent conduction material in the longitudinal direction extends and a Y axis perpendicular to the X axis when a tilt angle of a direction in which the end portion of the transparent conduction material in the longitudinal direction extends with respect to a rubbing direction R-R is in the positive direction, that is, an angle in the clockwise direction. On the other hand, when the tilt angle is in the negative direction, the areas in which disclination occurs are the first and third quadrants of the circle.

As described above, the description on the mechanism of occurrence of disclination is completed, and the detailed configuration of a liquid crystal display device 10 according to an embodiment of the invention will be described. FIGS. 5 to 11 sequentially show plan views of major production processes for describing the configuration of one sub pixel on the component substrate 20 of the liquid crystal display device 10 described with reference to FIGS. 1 and 2. Here, particularly, the disposition of the slit 43 in the pixel electrode 42 and the configuration around a window-shaped opening part 100 will be described. To a same element as that in FIGS. 1 to 4, a same reference numeral is assigned, and a description thereof in detail is omitted here. Hereinafter, the reference numerals shown in FIGS. 1 to 4 will be used for the description.

Figure 5:
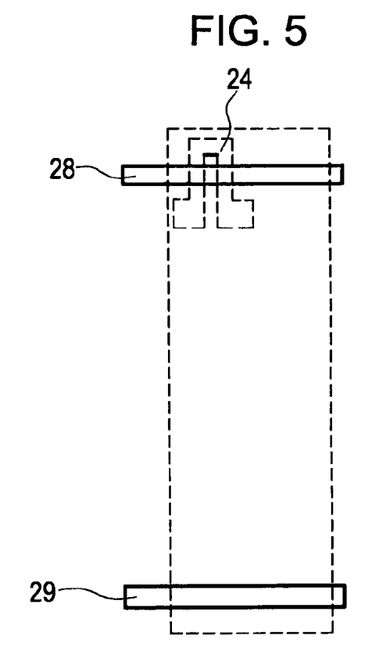
FIG. 5 is a diagram showing a state in which a gate electrode and a common electrode wiring are formed in a production process of a liquid crystal display device according to an embodiment of the invention.

FIG. 5 is a diagram showing a state in which a semiconductor layer 24 is formed on the component substrate 20 to have a switching transistor shape, a gate insulation film 26 is formed, and then the wirings of the gate and common electrodes 28 and 29 are formed. Here, since the area of one sub pixel is represented, the outer circumferential contour of the pixel electrode 42 to be described later is denoted by a dotted line.

Figure 6:
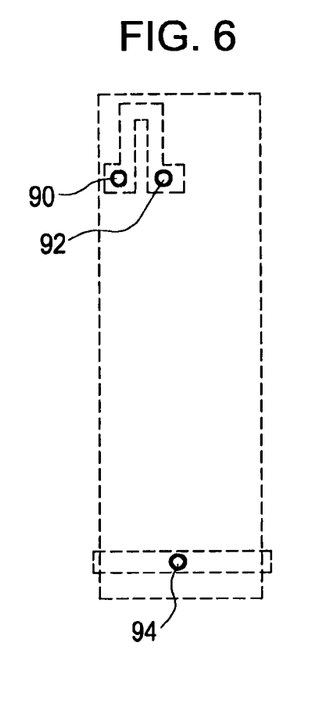
FIG. 6 is a diagram showing a state in which contact holes are formed in a source-drain portion of a switching element and a portion of a common electrode wiring, in a case where the process proceeds further from the state shown in FIG. 5.

FIG. 6 is a diagram showing a state in which an interlayer insulation film 30 is formed in the state shown in FIG. 5 and contact holes 90, 92, and 94 are disposed in the source-drain portions of the switching element and the common electrode wiring 29 portion. As shown in FIG. 1, since the film depths and the like to be removed from the contact holes 90 and 92 and the contact hole 94 are different from each other, this process may be divided into a plurality of processes.

Figure 7:
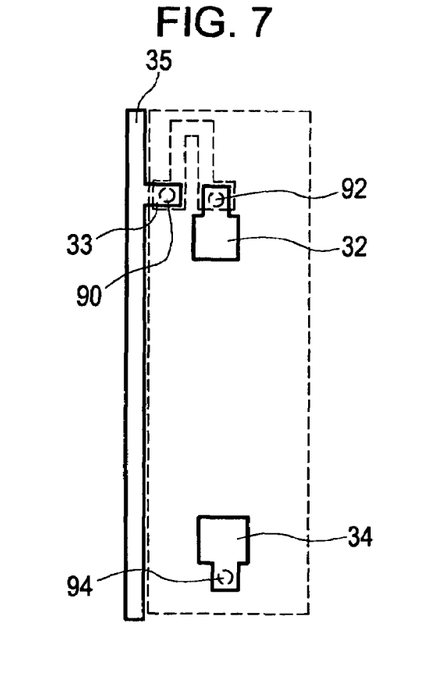
FIG. 7 is a diagram showing a state in which source-drain wirings and a common electrode connection part are formed in a case where the process proceeds further from the state shown in FIG. 6.

FIG. 7 is a diagram showing a state in which the source-drain wirings 32 and 33 and the common electrode connection part 34 are formed so as to be connected to the switching element and the common electrode wiring 29 through contact holes 90, 92, and 94 after the state shown in FIG. 6. This process, for example, is performed by forming a wiring metal layer on the whole surface and forming the source-drain wirings 32 and 33 and the common electrode connection part 34 in predetermined shapes using photolithographic technology. One between the source-drain wirings 32 and 33 is a source wiring and the other is a drain wiring. For example in FIG. 7, when one wiring disposed in the center of one sub pixel is configured to be the drain wiring 32, the other wiring drawn out toward the outside of the one sub pixel is the source wiring 33. In this example, the source wiring 33 extends to be formed as a data line 35.

Figure 8:
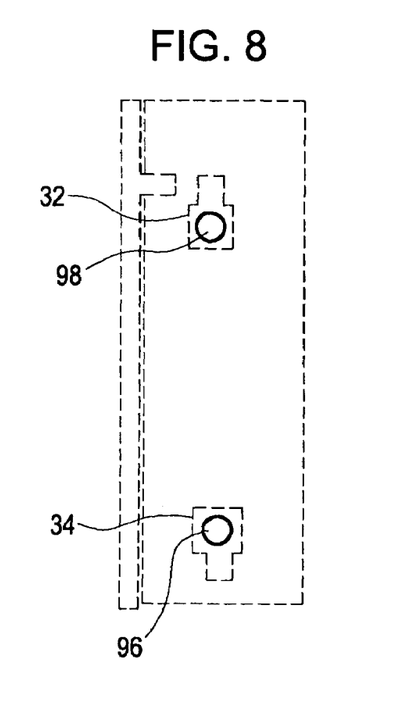
FIG. 8 is a diagram showing a state in which an insulation film is formed and contact holes are formed in positions corresponding to the common electrode connection part and a drain wiring in a case where the process proceeds further from the state shown in FIG. 7.

As shown in FIG. 8, an insulation film 36 is formed after the state shown in FIG. 7. This insulation film 36 is an insulation film layer interposed between a wiring layer including the source-drain wirings 32 and 33 and the like and a transparent conduction material film layer including the common electrode 38 which have been described with reference to FIG. 7 and is an interlayer insulation film in view of the disposition thereof. In the insulation film 36, a contact hole 96 is disposed in a position corresponding to the common electrode connection part 34 described with reference to FIG. 7, and in the example shown in FIG. 7, in a position corresponding to the drain wiring 32, a contact hole 98 is disposed. This contact hole 98 is an opening part prepared in advance for connecting the drain wiring 32 and the pixel electrode 42 to be described later, together.

Figure 9:
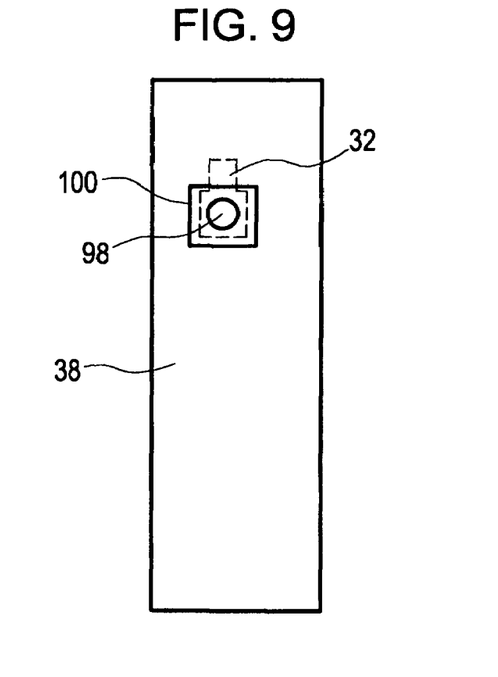
FIG. 9 is a diagram showing a state in which a common electrode having a window-shaped opening part is formed in a case where the process proceeds further from the state shown in FIG. 8.

FIG. 9 is a diagram showing a state in which an ITO film as a transparent conduction material film constituting a lower electrode is formed on the whole surface after the state shown in FIG. 8 and a common electrode 38 having a predetermined shape is formed by using photolithographic technology.

As described with reference to FIG. 8, since the contact hole 96 is prepared in advance in a position corresponding to the common electrode connection part 34, the common electrode 38 is connected to the common electrode connection part 34 through the contact hole 96 in the state shown in FIG. 9. As described above with reference to FIG. 7, since the common electrode wiring 29 and the common electrode connection part 34 are connected together through the contact hole 94, consequently the common electrode electric potential supplied to the common electrode wiring 29 is applied to the common electrode 38.

The common electrode 38 is disposed over one sub pixel, and a window-shaped opening part 100 having a window-like shape is disposed around the center of the common electrode 38. In this window-shaped opening part 100, since the contact hole 98 is prepared in advance as described with reference to FIG. 8 in an area in which the transparent conduction material film constituting the lower electrode is removed, the drain wiring 32 can be seen inside the contact hole 98 by removing the transparent conduction material film.

As shown in FIG. 8, although the common electrode 38 is separately disposed for each sub pixel, however, the common electrode 38 may be configured not to be divided for each sub pixel in some cases.

Figure 10:
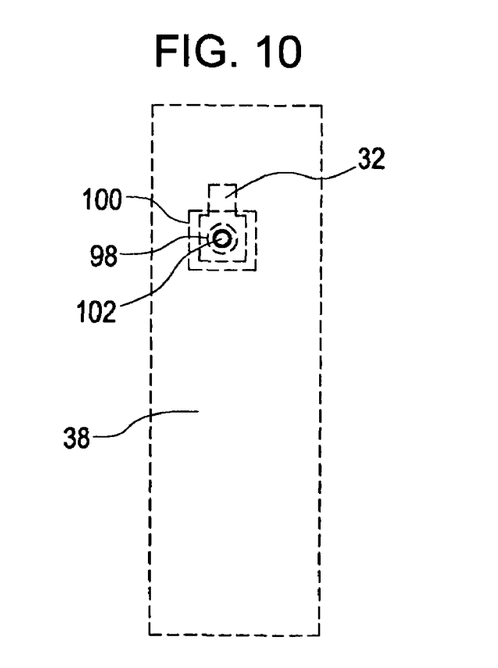
FIG. 10 is a diagram showing a state in which an FFS insulation film is formed and a contact hole is formed in a position corresponding to the window-shaped opening part in a case where the process proceeds further from the state shown in FIG. 9.

FIG. 10 is a diagram showing a state in which the FFS insulation film 40 is formed after the state shown in FIG. 8 and a contact hole 102 is disposed in a position corresponding to the window-shaped opening part 100. Accordingly, the drain wiring 32 can be seen inside the contact hole 102.

Figure 11:
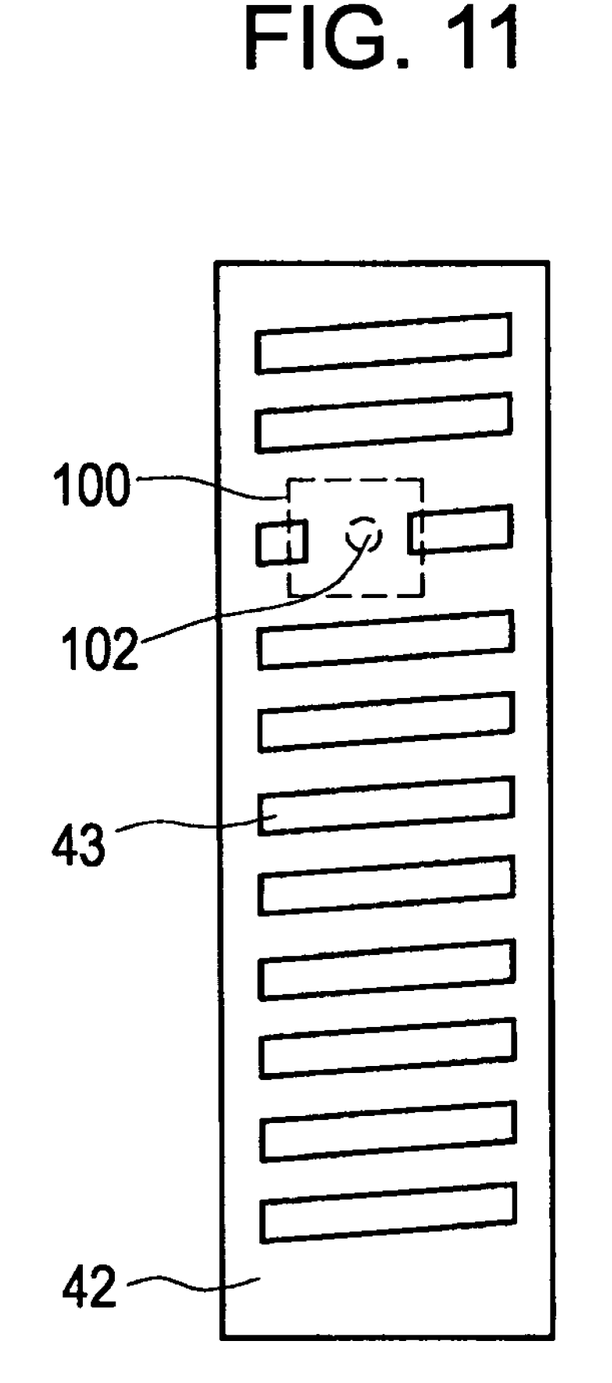
FIG. 11 is a diagram showing a state in which a pixel electrode having a slit is formed in a case where the process proceeds further from the state shown in FIG. 10.

FIG. 11 is a diagram showing a state in which the ITO film as a transparent conduction material film constituting the upper electrode is formed on the whole surface and the pixel electrode 42 having a predetermined shape is formed by using photolithographic technology, after the state shown in FIG. 10. As described with reference to FIG. 10, since the drain wiring 32 is exposed in the contact hole 102 and the pixel electrode 42 is formed in the state, the pixel electrode 42 is connected to the drain wiring 32 and the source electrode 33 of the switching element becomes the data line 35 as described with reference to FIG. 7, and accordingly, the electric potential of the data line 35 is supplied to the pixel electrode 42 by turning the switching element on.

The pixel electrode 42 is disposed over one sub pixel, and a plurality of slits 43 is disposed in the pixel electrode 42 for passing the electric field between the common electrode 38 serving as the lower electrode and the pixel electrode. The slits 43, in the example shown in FIG. 11, extend in the width direction of one sub pixel in approximately parallel with one another and are opening parts each having a thin and long groove shape in which both ends are closed. The slits 43 are opening parts for passing the electric field between the common electrode 38 serving as the lower electrode and the pixel electrode 42 serving as the upper electrode and may be referred to as electric field opening parts in view of their functions.

As shown in FIG. 11, since an area around the window-shaped opening part 100, as described with reference to FIGS. 7 to 10 and can be known from FIG. 1, has a complicated multi-level structure, the disposition of the slits 43 are different from that in other areas. In other words, the slits 43 are disposed to keep off the portion of the contact hole 102 in an area around the window-shaped opening part 100.

By using this process and configuration, the liquid crystal display device 10 in which a plurality of the slits 43 are disposed in the pixel electrode 42 is produced.

Figure 12:
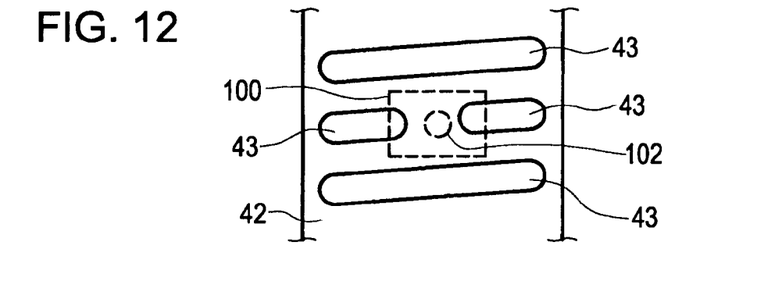
FIG. 12 is a diagram of a slit around the window-shaped opening part according to an embodiment of the invention.

Next, the disposition of the slits 43 in an area around the window-shaped opening part 100 will be described in more detail. FIG. 12 is an enlarged diagram of a part of FIG. 11. To a same element as that in FIG. 11, a same reference numeral is assigned, and a description thereof in detail is omitted here. Hereinafter, the reference numerals shown in FIGS. 1 to 11 will be used for a description. As shown in FIG. 12, both ends of each slit 43 have arc shapes for improving the capability of a process such as an etching process, and the appearances thereof are shown in the figure. As described above, there is a case where disclination occurs due to the arc shapes.

As shown in FIG. 12, in an area around the window-shaped opening part 100, one slit 43 is divided into two small sub-slits 43 interposing the contact hole 102 therebetween for keeping off the contact hole 102 that connects the pixel electrode 42 and the drain wiring 32 together. The small sub-slit 43 has a length in the longitudinal direction smaller than other slits 43 disposed in other areas.

As shown in FIG. 12, the slit 43 disposed in an area around the window-shaped opening part 100 has one end portion between both end portions in the longitudinal direction which is overlapped with the window-shaped opening part 100 in a plan view. It is preferable that the amount of the overlapped area is configured such that at least the arc-shaped portion of the end portion in the longitudinal direction is disposed inside the window-shaped opening part 100. In such a case, in a position corresponding to a position located below the arc shape portion of the end portion of the slit 43 in the longitudinal direction, the common electrode 38 serving as the lower electrode is removed. Accordingly, in the arc-shaped portion of the end portion of the slit 43 in the longitudinal direction, an electric field between the common electrode 38 serving as the lower electrode and the pixel electrode 42 serving as the upper electrode is not formed. Accordingly, in the area around the window-shaped opening part 100, the occurrence of disclination due to the arc shape of the end portion of the slit 43 can be suppressed.

The advantage of the disposition, described with reference to FIG. 12, in terms of display quality will be described in comparison with other disposition methods with reference to FIGS. 13 to 15. Although the disposition shown in FIG. 15 is an example of the present invention, the disposition shown in FIG. 12 is more effective than that shown in FIG. 15. These figures correspond to FIG. 12, and thus, to a same element as that in FIG. 12, a same reference numeral is assigned, and a description thereof in detail is omitted here.

Figure 13:
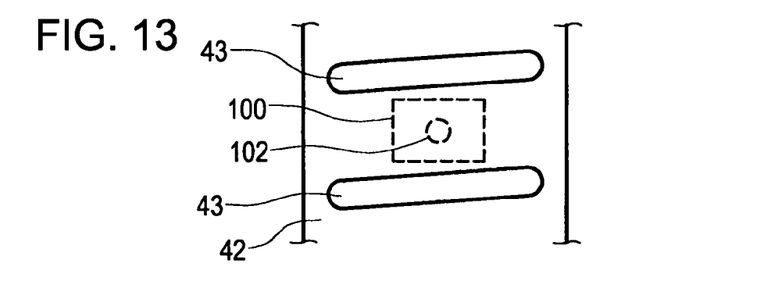
FIG. 13 shows an example of different disposition for comparison with FIG. 12.

FIG. 13 shows a method of not disposing a slit 43 for completely being kept off a position around the window-shaped opening part 100 having a complicated multi-level structure when slits 43 are disposed to be kept off the contact hole 102. According to this method, as can be easily understood in comparison with FIGS. 11 and 12, the disposition of the slits 43 in one sub-pixel is not uniform and in the example of disposition shown in FIG. 11, the number of the slits 43 decreases by at least one. Accordingly, in the disposition method shown in FIG. 13, when compared with the disposition methods shown in FIGS. 11 and 12, the electric field for driving liquid crystal molecules becomes non-uniform within one sub-pixel and there is a case where the liquid crystal molecules cannot be sufficiently driven in an area in which the number of the slits 43 has been decreased. On the other hand, in the disposition methods shown in FIGS. 11 and 12, the possibility in the case decreases and display quality is superior to that in the disposition method shown in FIG. 13.

Figure 14:
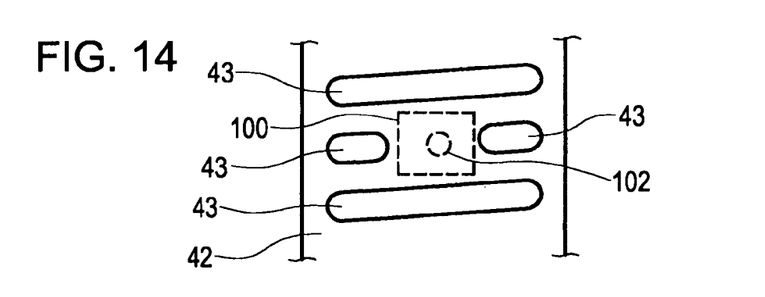
FIG. 14 shows another example of different disposition for comparison with FIG. 12.
Figure 15:
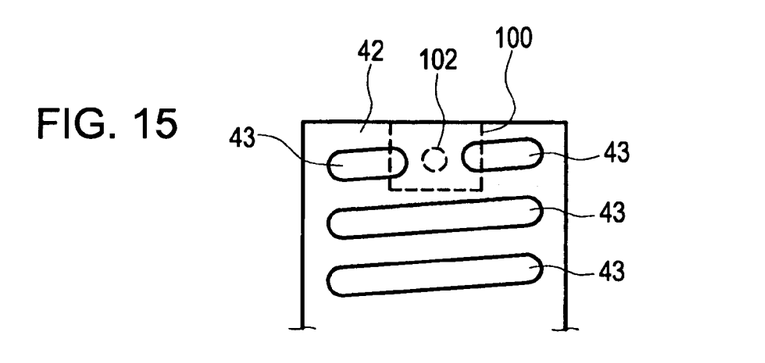
FIG. 15 shows still another example for comparison with FIG. 12 and is a diagram for describing disposition of the window-shaped opening part.

FIG. 14 shows a method of disposing slits 43 that are shorten in the longitudinal direction in the range in which the slits are not overlapped with the window-shaped opening part 100 for being kept off a position around the window-shaped opening part 100 having a complicated multi-level structure when the slits 43 are disposed to be kept off the contact hole 102. According to this method, as can be easily understood in comparison with FIGS. 11 and 12, the area of the opening part of the slits 43 around the window-shaped opening part 100 decreases, and below the arc shape of end portions of the slits 43, the common electrode 38 is disposed, and thereby the disclination may easily occur. Accordingly, in the disposition method shown in FIG. 14, when compared with the disposition methods shown in FIGS. 11 and 12, the electric field in an area around the window-shaped opening part 100 for driving liquid crystal molecules is not sufficient, and there is a possibility in occurrence of disclination in the slits 43 prepared at the sacrifice of the lengths in the longitudinal direction, and thereby display quality in an area around the window-shaped opening part 100 is not sufficient. On the other hand, in the disposition methods shown in FIGS. 11 and 12, the possibility in the occurrence of disclination decreases and display quality is superior to that in the disposition method shown in FIG. 13.

In FIG. 15, a configuration in which the window-shaped opening part 100 is almost matched to the outer circumferential end portion of the pixel electrode serving as the upper electrode is used for improving the opening ratio and the like is used. The dispositional relationship between the window-shaped opening part 100 and the slits 43 is the same as that shown in FIG. 12. Accordingly, the display quality can be expected to be equivalent to the configuration shown in FIG. 12 or improvement of the opening ratio and the like can be expected. However, there is a possibility for generating a problem in a production process. In other words, when the window-shaped opening part 100 in which the common electrode 38 serving as the lower electrode is removed is disposed in the outer circumferential end portion of the pixel electrode serving as the upper electrode, a boundary of the cut face of the level difference directly appears in the outer circumferential end portion. Accordingly, for example, an etching liquid or the like permeates from the boundary of the cut face of the level difference along the level difference, and thereby there is a possibility that the upper electrode forms a short circuit along the level difference. To the contrary, in the configurations shown in FIGS. 11 and 12, the window-shaped opening part 100 is disposed on the inner side relative to the outer circumferential end portion of the pixel electrode 42 serving as the upper electrode, and it is possible to suppress the effect of formation of a short circuit or the like due to the level difference of the window-shaped opening part 100. Although an example of disposition in which the slit 43 is divided into two small sub-slits 43 by the window-shaped opening part 100 to interpose the contact hole 102 therebetween, a small sub-slit 43 which is not divided may be used when the window-shaped opening part 100 is disposed on one side of the outer circumferential end portions corresponding to the slit 43 in the longitudinal direction.

As described above, according to the configurations shown in FIGS. 11 and 12, disposition of slits for suppressing the occurrence of disclination can be made in consideration of the multi-level structure around the contact hole for the pixel electrode serving as an upper electrode, and thereby it is possible to improve the display quality of the liquid crystal display device.

What is claimed is:

1. A liquid crystal display device comprising an upper electrode and a lower electrode interposing an insulation layer therebetween,
    wherein an electric field opening part for passing an electric field is formed in the upper electrode and liquid crystal molecules are driven by applying a voltage between the lower electrode and the upper electrode,
    wherein an upper electrode wiring and the upper electrode which interpose an interlayer insulation film therebetween, together is disposed below the lower electrode,
    wherein a window-shaped opening part formed by partially removing the lower electrode for connecting the upper electrode wiring and the upper electrode, and
    wherein one end portion of the electric field opening part in the longitudinal direction around the window-shaped opening part is disposed to be overlapped with the window-shaped opening part in a plan view.

2. The liquid crystal display device according to claim 1, wherein the window-shaped opening part is disposed on an inner side relative to an outer circumferential end portion of the upper electrode.

3. The liquid crystal display device according to claim 1, wherein an area in which the one end portion of the electric field opening part in the longitudinal direction is overlapped with the window-shaped opening part in the plane is an area around the window-shaped opening part for suppressing the occurrence of disclination.

4. The liquid crystal display device according to claim 1, wherein the electric field opening part is divided by the window-shaped opening part and one end portion of each divided electric field opening part in the longitudinal direction is disposed to be overlapped with the window-shaped opening parting a plane.

5. The liquid crystal display device according to claim 1, wherein the upper electrode is a pixel electrode connected to a data line through a switching element, and wherein, in the insulation layer of the window-shaped opening part, a contact hole for connecting a drain wiring of the switching element and the pixel electrode together is formed.

6. The liquid crystal display device according to claim 5, wherein the one end portion of the electrode opening part in the longitudinal direction is not overlapped with the contact hole in a plan view.

7. The liquid crystal display device according to claim 1, wherein the upper electrode is a common electrode connected to a common electrode wiring, and wherein in the insulation layer of the window-shaped opening part, a contact hole for connecting a common electrode connection part of the common electrode wiring and the common electrode together is formed.

8. The liquid crystal display device according to claim 1, wherein the electric field opening part has a slit shape in which both ends in the longitudinal direction are closed.

9. The liquid crystal display device according to claim 1, wherein the electric field opening part has a comb-teeth like shape in which one end portion in the longitudinal direction is opened.

* * * * *